United States Patent [19]

Mathews

[11] Patent Number: 5,196,854
[45] Date of Patent: Mar. 23, 1993

[54] INFLIGHT WEATHER AND GROUND MAPPING RADAR

[75] Inventor: Bruce D. Mathews, Catonsville, Md.

[73] Assignee: Westinghouse Electric Corp., Pittsburgh, Pa.

[21] Appl. No.: 714,132

[22] Filed: Jun. 13, 1991

[51] Int. Cl.[5] .................... G01S 13/95; G01S 13/89
[52] U.S. Cl. .................................. 342/26; 342/92; 342/205
[58] Field of Search .................... 342/26, 205, 92

[56] References Cited

U.S. PATENT DOCUMENTS

| | | | |
|---|---|---|---|
| Re. 33,152 | 1/1990 | Atlas | 342/26 |
| 2,736,020 | 2/1956 | Atlas | 343/26 |
| 4,023,165 | 5/1977 | Holt et al. | 343/26 |
| 4,223,309 | 9/1980 | Payne | 342/26 |
| 4,435,707 | 3/1984 | Clark | 342/26 |
| 4,649,388 | 3/1987 | Atlas | 342/26 |
| 4,835,536 | 5/1989 | Piesinger et al. | 342/26 |
| 4,940,988 | 7/1990 | Taylor, Jr. | 342/93 |

OTHER PUBLICATIONS

Merrill I. Skolnik, Introduction to Radar Systems, Second Edition pp. 498-507.
Sperry Avionics for the S-76.
ARINC Characteristic 708-5 Airborne Weather Radar, Aeronautical Radio Inc., 2551 Riva Road, Annapolis, Md. 21401, Jan. 11, 1988.
M. I. Skolnik "Introduction to Radar Systems" 1981, McGraw-Hill, pp. 471-472, par. 13.2.
P. L. Stride et al. "Airborn Weather Radar" Philips Telecommunication Review, vol. 32, No. 3, Aug. 1974, pp. 201-203.

Primary Examiner—Gilberto Barron, Jr.
Attorney, Agent, or Firm—W. G. Sutcliff

[57] ABSTRACT

The present invention is a radar system that corrects for changes in apparent reflectivity and two-way precipitation attenuation using a correction curve that includes a segment for low rain rates, a segment for high rain rates and, if desired, a transition segment for medium rain rates. The signal to noise ratio is further improved by using a sliding azimuth window during post detection integration processing.

11 Claims, 19 Drawing Sheets

INFLIGHT WEATHER AND GROUND MAPPING RADAR

CROSS REFERENCES TO RELATED APPLICATIONS

This application is related to U.S. applications entitled Windshear Radar System With Upper And Lower Elevation Radar Scans by Bruce D. Mathews, Paul D. Mountcastle and Walter W. Patterson Ser. No. 07/714,133; Modular Solid State Radar Transmitter by John Clarke, Joseph A. Faulkner, Gregory K. Sinon and Brian J. Misek Ser. No. 07/713,259;Low Vibration Sensitivity Crystal Resonator Arrangement by Michael M. Driscol and Norman George Matthews Ser. No. 07/713,260 now U.S. Pat. No. 5,136,300; and Turbulence Radar System by Scott C. Borden, Joseph Stevenson and Bruce D. Mathews Ser. No. 07/714,135 all filed concurrently herewith and all incorporated by reference herein.

BACKGROUND OF THE INVENTION

1. Field of the Invention

The present invention is directed to an airborne weather and ground mapping radar system which improves location accuracy of weather and ground features and more particularly to a system that provides at least a two segment approximation for rain attenuation and uses a sliding azimuth window to produce an improved signal to noise ratio.

2. Description of the Related Art

Conventional weather radar determines the location and magnitude of weather features from the reflection of the radar signal from precipitation. Radar signals attenuate as they pass through precipitation and, as result, a return from a range cell deep in a precipitation region is attenuated more than a return from a range cell not as deep in the precipitation region, thereby causing returns received by the radar system to in- accurately portray the weather features. In addition as rain rates change from low to high the attenuation increases, further increasing the inaccuracy of the weather features shown by the radar display. Conventional radar system such as described in U.S. Pat. Nos. 4,835,536, 4,223,309 and RE 33,152 do not take into account the increased attenuation caused by higher rain rates and only provide a linear compensation for a single low rain rate. As a result, pilots using conventional weather radar systems do not receive an accurate picture of the weather deep in or behind precipitation regions. What is needed is a system that accurately depicts the weather throughout a weather system.

SUMMARY OF THE INVENTION

It is an object of present invention to provide an accurate airborne weather and ground mapping radar.

It is a further object of the present invention to enhance accuracy of an airborne weather and ground mapping radar system by providing at least a two segment attenuation/reflectivity correction for two precipitation rates.

It is another object of the present invention to enhance accuracy of a weather radar by performing a sliding azimuth window post detection integration operation.

The above objects can be attained by a system that corrects for two-way precipitation attenuation using a correction curve that includes a segment for negligible self attenuation caused by a low rain rate, a segment for dominant self attenuation caused by a high rain rate and, if desired, a transition segment region between the negligible and dominant segments and which characterizes attenuation at a medium rain rate. The signal to noise ratio is further improved by using a sliding azimuth window during post detection integration process which occurs before attenuation compensation operations.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
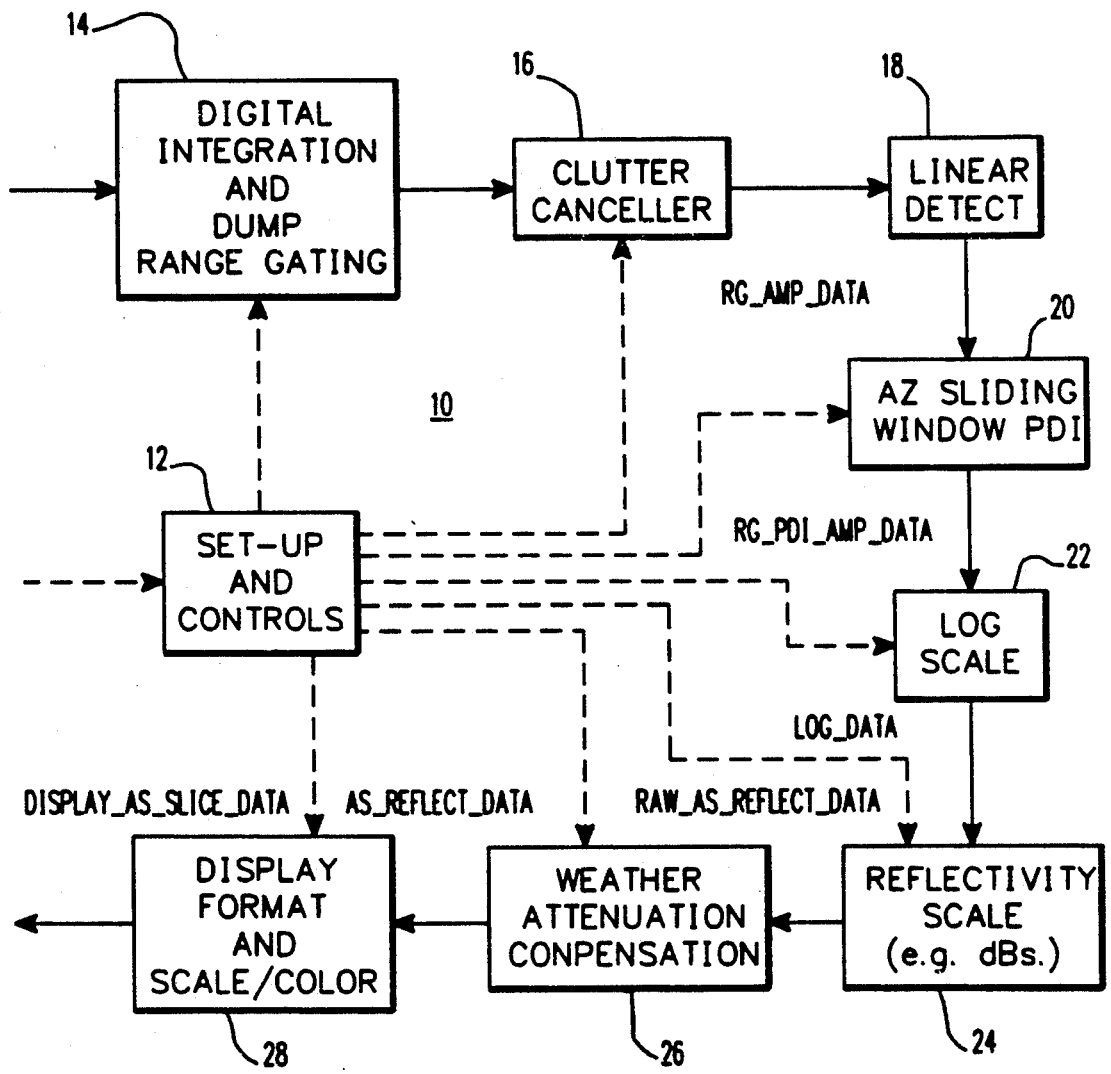
FIG. 1 is a block diagram of the processing operations performed by the present invention.

A weather map is distinguishable from a ground map by the sensitivity time control (STC), compensation for intervening weather attenuation, and amplitude depiction on the display. Weather and ground map processing, as illustrated in FIG. 1, is dependent upon controls provided by a set-up operation 12 which include specifying the azimuth window width in azimuth sliding window post detection integration (PDI), signal pulsewidth (as function of selected range scale), manual gain control and de-clutter. The system 10 is set-up 12 by receiver configuration words, pulsewidth, and pulse repetition frequency (PRF) selections for the operator selected range scales. The output from the receiver is a 2 $\mu$sec. complex sample with in-phase and quadrature phase data words each sign +10 whole bits. The first operation 14 is to digitally integrate these samples into words corresponding to the desired range gate based on the selected range scale. If the de-clutter option (weather mode only) has been selected, a three pulse canceller 16 eliminates mainbeam clutter positioned about zero Doppler frequency and passes only returns with non-zero Doppler frequencies. Subsequently, the data is linearly detected 18. A sliding azimuth window is then used during post detection integration (PDI) processing 20 to improve the signal to noise ratio of the weather return. Azimuth sliding window PDI has been used in military aircraft to improve ground mapping. An assumed noise floor is used to interpret 22 the amplitude data into a LOG numerical base. In the weather mode, the logarithm of the amplitude is interpreted as a rain return. Beginning at the near range gates and proceeding to farther ranges, the amount of two way attenuation due to each preceding range gate is accumulated and used to boost the initial, apparent amplitude of the rain return. The final azimuth slice of range gated weather returns is obtained by converting from the attenuation compensated rain return in dBz to a standard color code in the ARINC standard. For the smaller range scales (e.g. 10 nautical miles), the range gate size is not matched to the display pixel and the range indices for the azimuth slice are synthetically generated. In the real beam ground map mode, since ARINC displays do not allow for gray scale presentation, a different conversion from LOG amplitude to color code is employed. The weather and ground map modes operate preferably in a continuous scan over ±90° about the nose in local level co-ordinates. However, a reduced sector scan (±45°) is possible. The operator has manual control over the antenna tilt, i.e. the angle with respect to the local level plane, and aims the beam to investigate weather at different heights. The radar waveform is low LPRF, which essentially means unambiguous in range with little or no Doppler information to be extracted, and which provides range to or beyond the selected range scale.

At shorter ranges, the PRF provides some second time around error (STAE) rejection. In general, range gates are matched to display pixels for the selected range scale. The processing illustrated in FIG. 1 is supported by conventional initiation, beam pointing, clutter positioning, timing alignment, STC, etc. processes which will not be elaborated upon here. In general, range gated automatic gain control (AGC) is not necessary since operator adjustment of antenna tilt and manual gain control is presumed. However, the sensitivity time control (STC) profiles for the weather mode change to R**3 at about 110 km and require timing adjustments with range scale changes.

Figure 2:
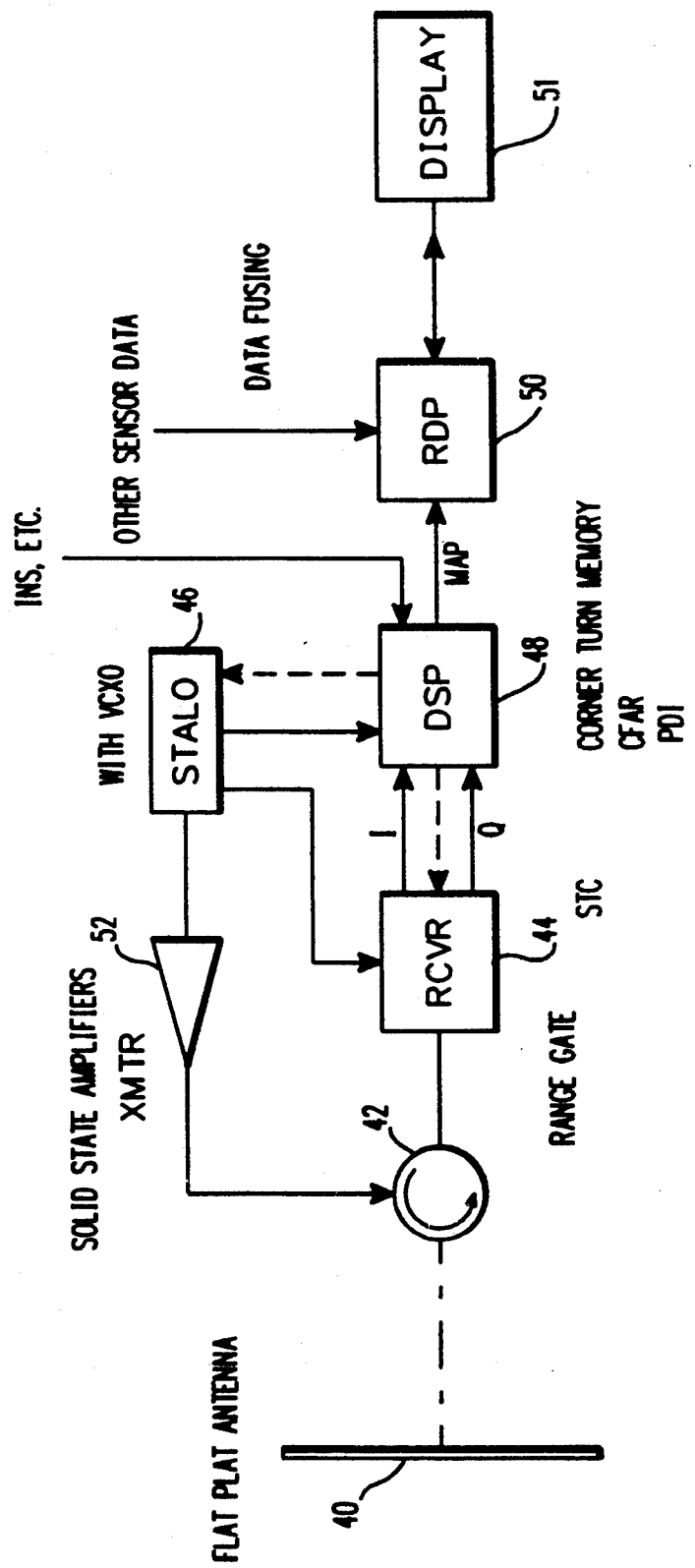
FIG. 2 illustrates the hardware components of the present invention.

The preferred equipment configuration is illustrated in FIG. 2 and includes a flat plate antenna 40 having a gimbal control 42 with the antenna providing radar returns to a receiver 44. The receiver 44 converts the received return into digital amplitude values using an oscillator 46. The digital values are processed by a digital signal processor 48 which performs the clutter cancellation, linear detection and post detection integration operation 20. The log scale conversion 22, reflectivity adjustment 24, attenuation compensation 26 and display formatting 28 are performed by a general purpose radar processor 50 and the display data is displayed on display 51. A transmitter 52 provides the radar pulses to the antenna 40. This equipment configuration is described in more detail in the related applications entitled Modular Solid State Radar Transmitter and Low Vibration Sensitivity Crystal Resonator Arrangement previously mentioned. The setup operation 12 includes selecting either the ground map mode or the weather map mode. It should be noted that this selection can be made at a higher level (an executive level) of control to allow interleaving the selected mode on a scan to scan basis with the turbulence processing described in the related Turbulence Radar System application. The waveform of the radar (the PRF and pulsewidth) are determined solely on the basis of range scale with higher range scales requiring a lower frequency PRF and larger pulsewidth. The pulse waveform is selected by interpreting the range scale input to obtain a PRF and pulsewidth. The azimuth sliding window operation 20 is configured for the number of pulses per distance pixel where:

Interpulse Period $(IPP)$ = Pixel Angle * PRF/Scan Rate    (1)
Slices = Beamwidth/Pixel Angle    (2)
PDI Period = Slice * IPP    (3)
Offset = .5 * slices    (4)

For a 256 by 256 pixel display, the pixel angle is 0.225 degrees. The time until the next slide of the sliding window is the pixel angle divided by the antenna scan rate. If the preferred 45 degrees per second scan rate and 3 degree beamwidth are used 12 azimuth slices of 0.225 degrees each complete the sliding window set up. The set up operation also produces reflectivity constants for weather and ground mapping for filled and unfilled beams in accordance with equations 5-7 with equation 5 being the equation for a filled weather beam, equation 6 for a filled ground clutter beam and equation 7 for an unfilled weather beam where equation 6 is used for an unfilled ground clutter beam.

$$F_w = \frac{R_{mx}^3 c \, (4\pi)^3 \, kT_o F_n L_o \lambda^2}{2 P_k G^2 \pi^5 (.93) Z_o \theta_B^2 D_x (\Delta R)^2 G_{PDI}} \tag{5}$$

$$F_C = \frac{R_{mx}^3 c \, (4\pi)^3 \, kT_o F_n L_o}{2 P_k G^2 \lambda^2 \theta_B (\Delta R)^2} \tag{6}$$

$$U_W = \frac{R_{mx}^3 c \, (4\pi)^3 \, kT_o F_n L_o \lambda^2}{2 P_k G^2 \pi^5 (.93) Z_o \phi_B D_x (\Delta R)^2 G_{PDI}} \tag{7}$$

where $P_k$ = transmitter peak power, G = antenna directive gain with respect to isotropic, $\lambda$ = wavelength, Z = volumeric reflectivity constant converting to dBZ. ($mm^6/m^3$), $\sigma_o$ = area backscatter coefficient, RCS/sq.m., $\Delta R$ = range gate length, $D_x$ = diameter of min. detectable rain cell (3 n.mi), $\phi_B$ = antenna 3 dB. beamwidth in elevation, $\theta_B$ = antenna 3 dB. beamwidth in azimuth, $\alpha(R)$ = cumulative attenuation, including atmospheric, intervening weather, manual AGC, and/or STC attenuations, $G_{PDI}$ = the gain of the signal relative to noise of the PDI process, $kT_o$ = Boltzman Thermal Noise spectral density, $F_n$ = system operating noise figure, $L_o$ = loss budget, $R_{mx}$ = the maximum range of the display scale, the range at which STC attenuation has decreased to unity, $\alpha(0)$ = the STC applied attenuation for the first range gate and equals 4 $\theta_B D_x/[\pi R_{mx}^3]$ and $F_W$, $U_C$, $F_C$ are the supplied radar system constants.

Figure 3:
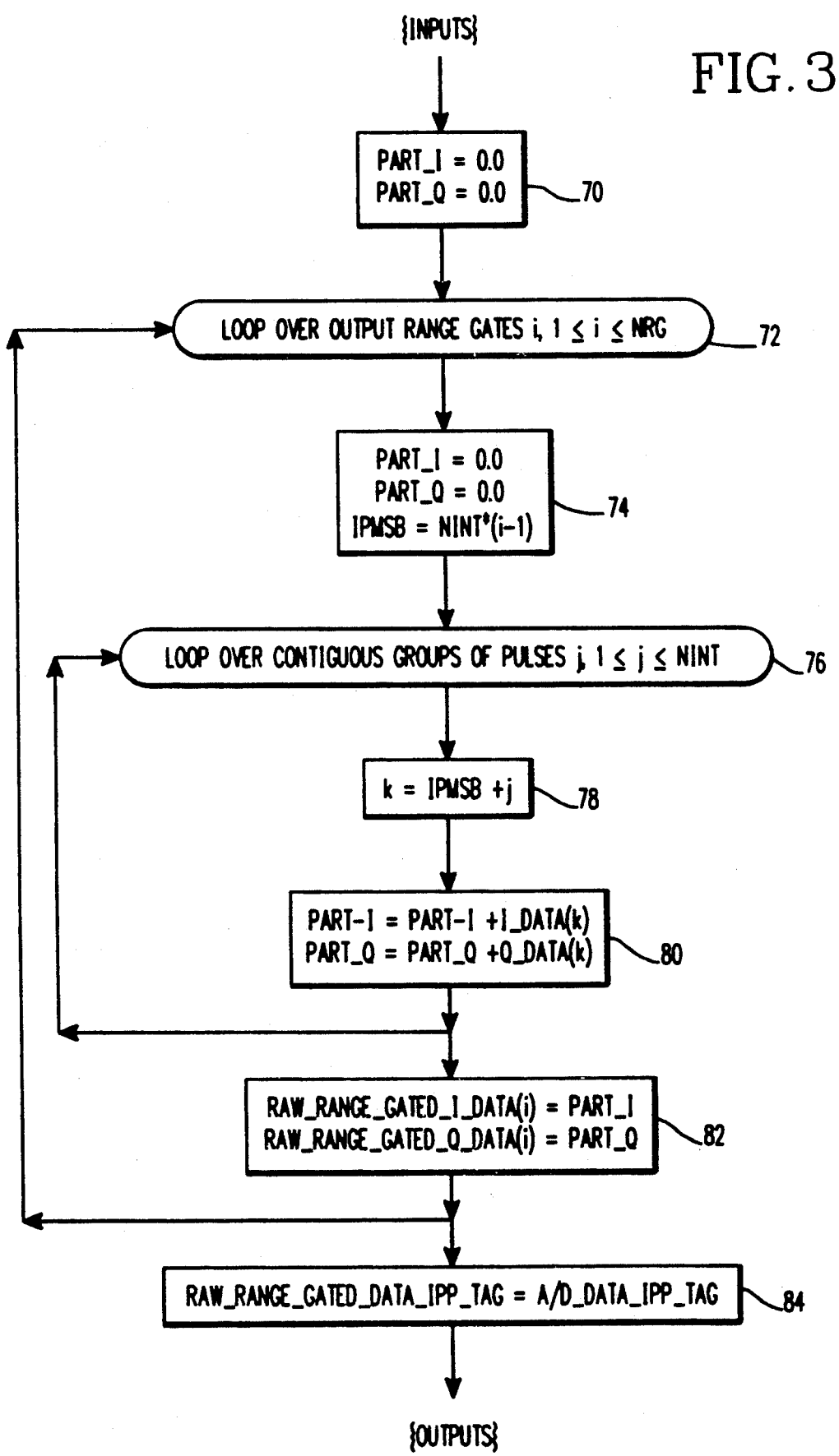
FIG. 3 is a flowchart of the range gate processing 14.

The input to the range gate formation process 14, see FIG. 3, is in-phase and quadrature phase words from the receiver. In this process a loop is formed over all the A/D input samples and successive samples are summed together. The loop is terminated after forming the total processed gates. The process 14 groups successive pulses into range gates such that the resulting digital range gates will be contiguous and not overlapped. The input to the process includes two real vectors with each component of the vector the time ordered sample, the IPP count from the start of the scan identifying the azimuth position and is assumed to be scaled for noise at 1.4 quanta. The process starts by setting 70 the in-phase and quadrature phase processing variables to 0. The system then enters a loop over the number of range gates during which the processing variables are again set 74 to 0 and the sample index pointer is calculated from the number of samples to be integrated into a range gate and the range gate index. The system then enters an interior loop 76 in which an index of the time samples in question is calculated 78 and the input data is accumulated 80 for the number of pulses to be integrated. The system then the stores the ordered in-phase raw range gated data and then, if all range gates have been processed, sets 84 a tag which is the relative interpulse period (IPP) count identifying the time azimuth of the data since start of the elevation or bar scan.

Figure 4A:
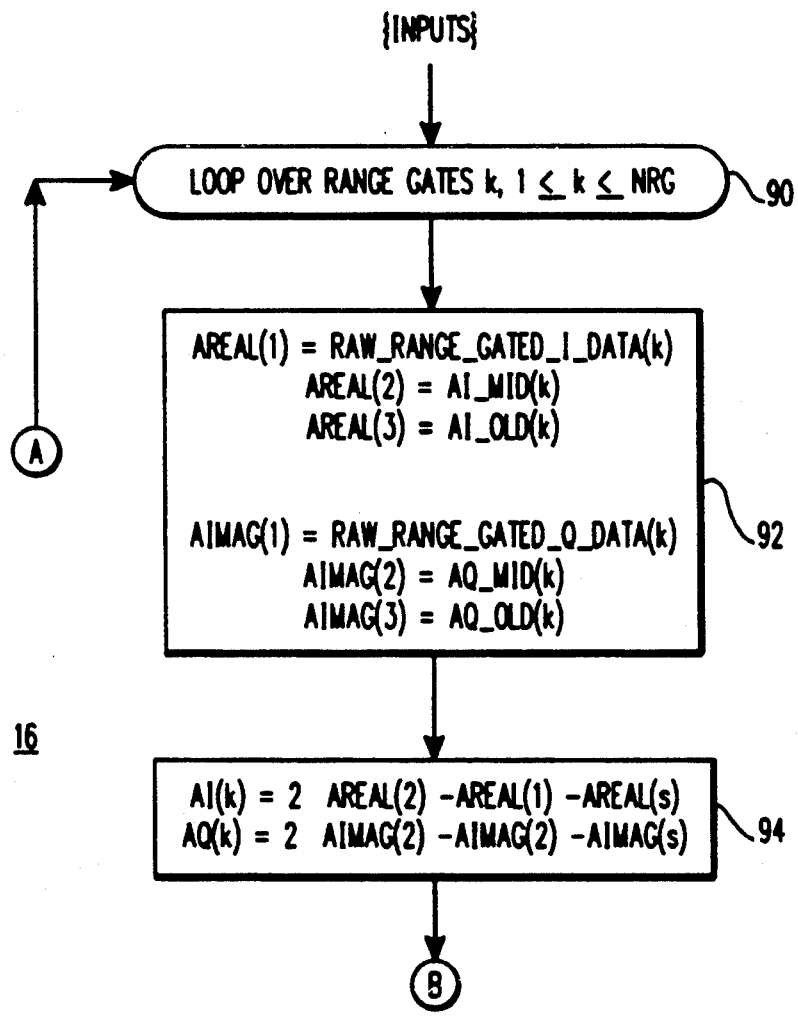
FIGS. 4A and 4B depict the clutter canceller operation 16.
Figure 4B:
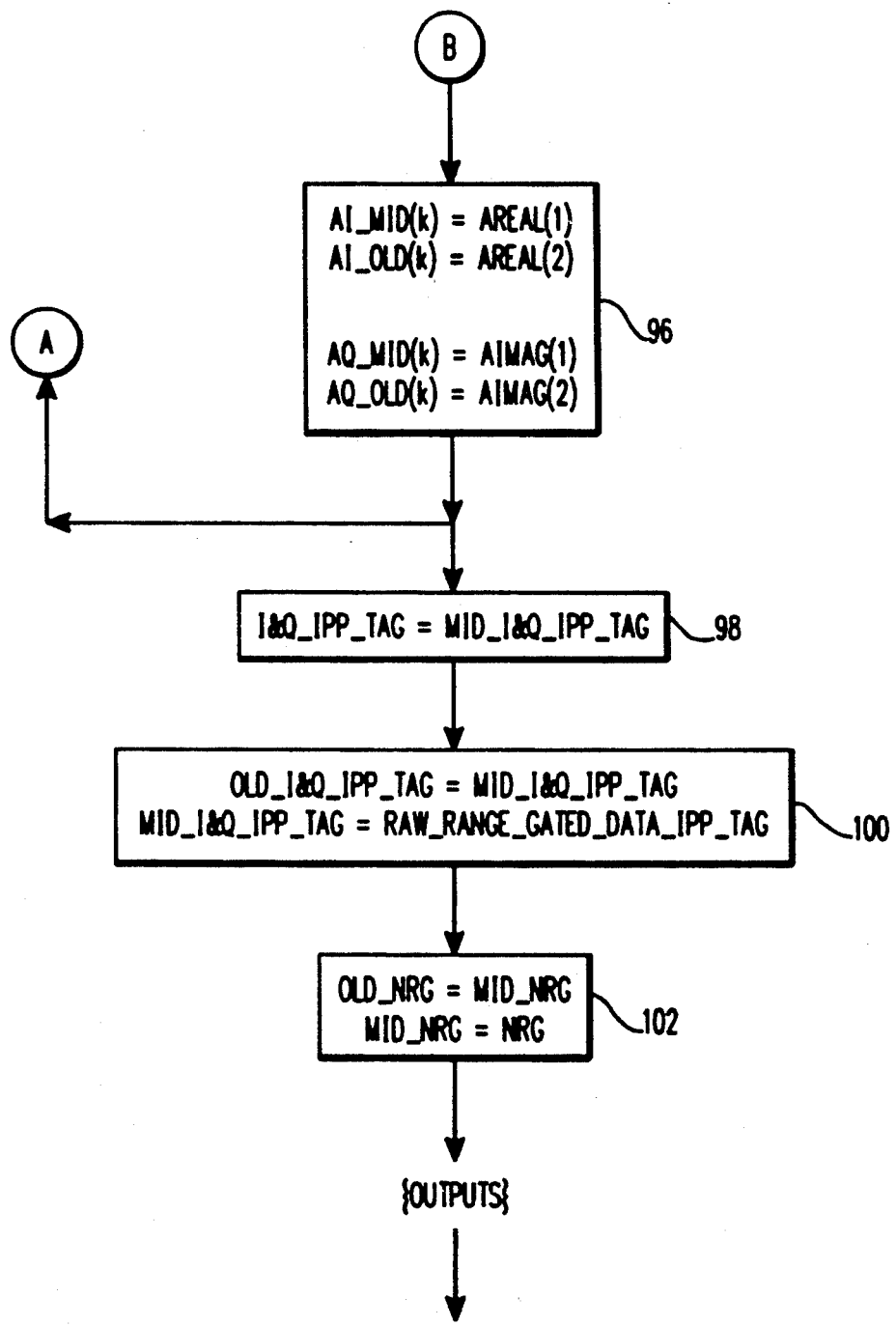

When selected by the operator the clutter cancellation process 16, as illustrated in figures 4A and 4B, employs a classic three pulse clutter canceller to restrict weather reflectivity returns to returns with Doppler frequencies large enough to lie away from regions possibly containing main beam clutter. This option is preferably not activated during real beam ground map operation. When enabled, the output is referenced to the midpoint data and recirculating data is updated. Upon initiation there will not be valid output until the third IPP, during which time the recirculating data is constructed. When the clutter cancellation operation is not selected the process 16 merely takes input data (at the latest time) and writes it to the output. The inputs to the process include the raw range gated data from process 14 and the tag identifying the azimuth. The process 16 starts by entering a loop 90 during which the real and imaginary data is stored 92. The system then calculates 94 the vector values of the in-phase and quadrature phase data. The intermediate outputs are then stored 96 for wrap around to the input in the next cycle. Next, the system stores 98 the relative IPP counter index since the start of the elevation scan, thereby identifying azimuth angle. The system then stores 100 and 102 data and the tags to wrap around to the input of the clutter canceller.

Figure 5:
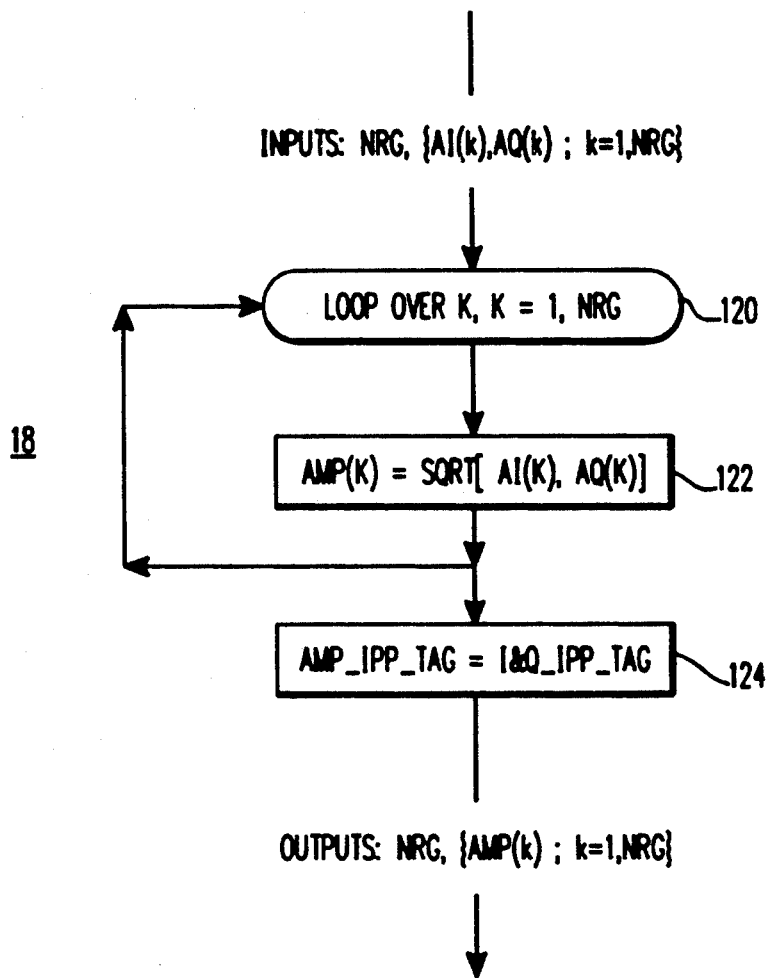
FIG. 5 illustrates the linear detection operation 18.

The linear detection process 18, as illustrated in FIG. 5, converts the input of the in-phase and quadrature phase digitally integrated samples into a voltage amplitude using an algorithm approximating a square root operation and then passes the output to the post detection integration process 20. The inputs are the in-phase and quadrature phase vectors, the number of range gates and the azimuth angle tag. The operation is performed in a loop 120 in which the amplitude is calculated 122 using a routine which performs the operations of equations 8, 9 and 10:

$$V_{max} = \text{Max}(|x|, |y|) \quad (8)$$
$$V_{min} = \text{Min}(|x|, |y|) \quad (9)$$
$$SQRT = V_{max} + \tan(\pi/8) * V_{min} \quad (10)$$

The system then stores 124 the azimuth tag. The outputs are the number of range gates and the amplitude vector.

Figure 6A:
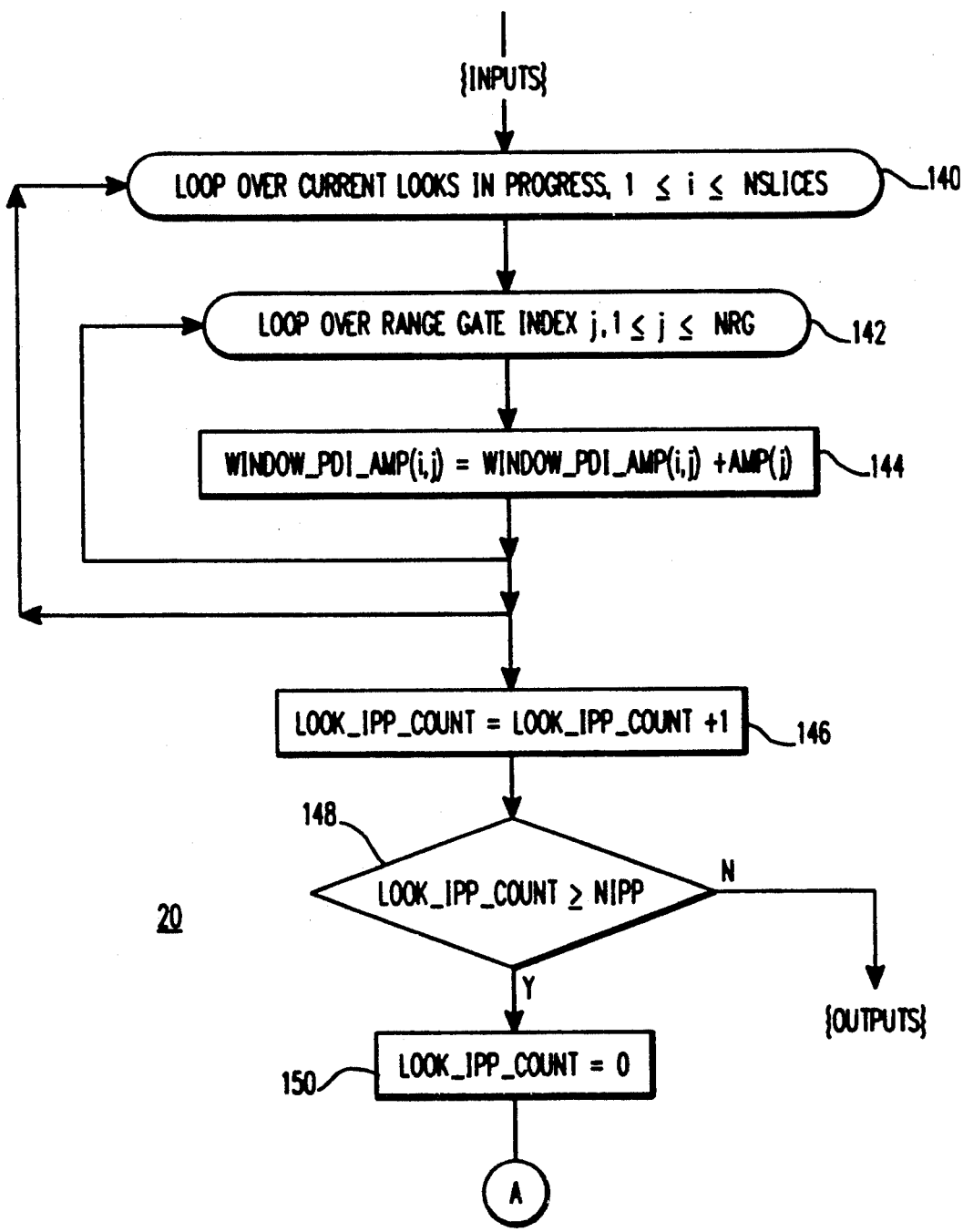
FIGS. 6A and 6B show the sliding window integration process 20.
Figure 6B:
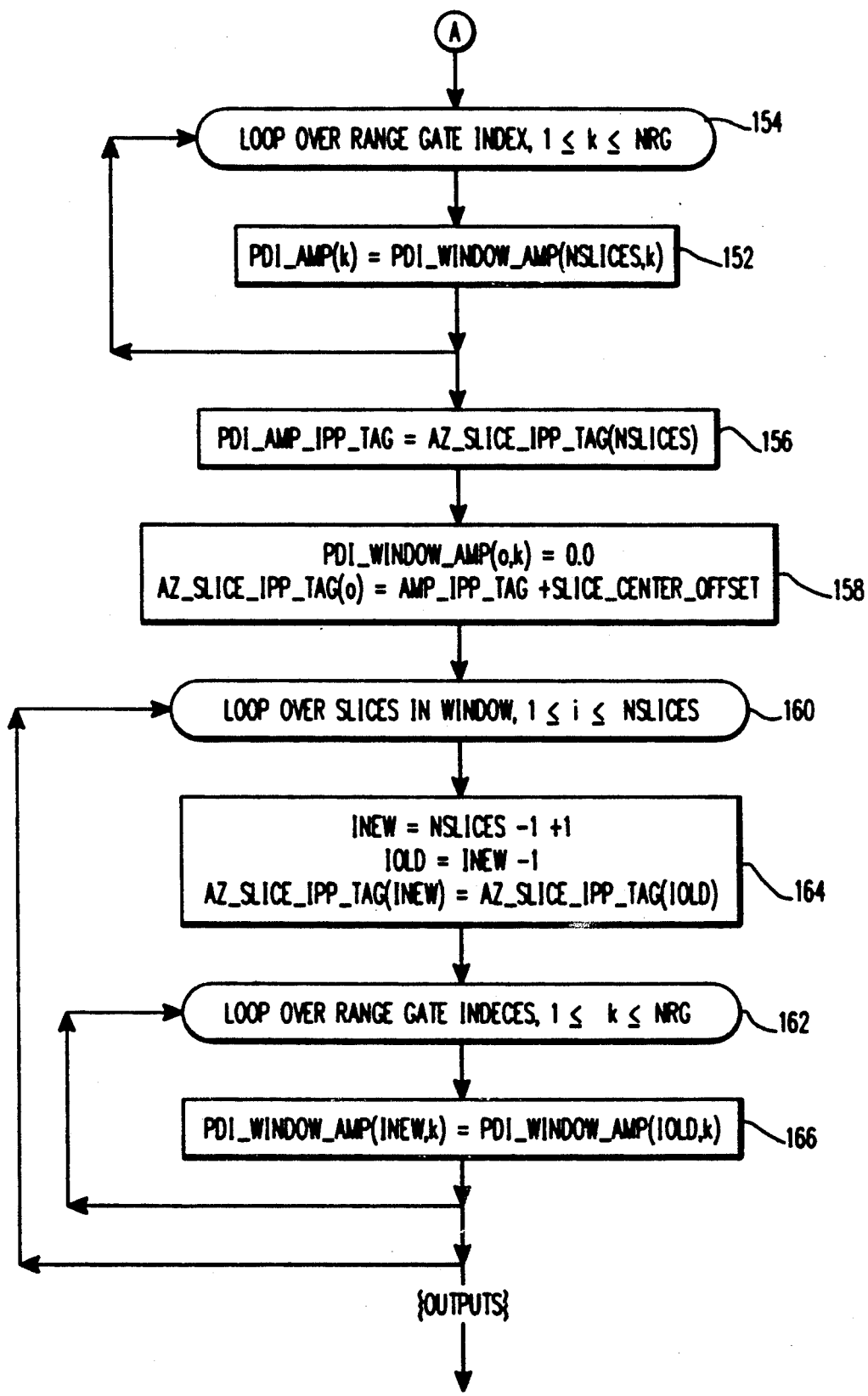

During the azimuth sliding window post detection integration operation 20, as illustrated in FIGS. 6A and 6B, the linear detected data is accumulated into azimuth slices for the mechanically scanning beam. A separate azimuth slice of reflectivity as a function of range is prepared at a pixel scan rate, that is, for a 256 by 256 pixel display, a new azimuth slice will be output every 1/256 radians of beam motion. The sliding window maintains concurrent post detection integration (PDI) for a number of azimuth slices (the minimum angle step of the display) during the dwell time o the antenna beam during its scan. When a slice has been completed an output record is written at the initiation of an elevation or bar scan. The vector of the PDI amplitudes is zeroed and the process 20 begins outputting data at the completion of a single look. The inputs are the number of range gates, the amplitude vector and the azimuth angle tag, and the outputs are the vector of range gates, integrated, scaled amplitude data for each slice, the number of range gates and the azimuth tag. The system starts by looping 140 and 142 over the azimuth slices and the number of range gates to accumulate 144 the amplitude data. The system then updates the look count which is the total number of interpulse periods which have been integrated into the current azimuth sliding window. When this count has been incremented and is greater than the number of pulses to be collected before a new azimuth record must be initiated, an output is written and the azimuth window index slides. If the count is not sufficient to produce an output, the look count is set 150 to zero and the outputs are written 152 in a loop 154. The system then stores 156 the IPP tag for the time center of the azimuth slice. The system then clears 158 the amplitude window and stores the sum of the start of the slice and the center of the slice. The system then enters a pair of loops 160 and 162 in which the window is slid 164 and 166 by storing the values for the wrap around.

The scaling operation 22 log compresses and scales the IPP input data by the noise in the amplitude. The noise is assumed to have accumulated through the PDI process. This process effectively performs:

$$\text{Amplitude} = 10 \log_{10}[(S_i + N_i)/<N_p>] \quad (11)$$

Figure 7:
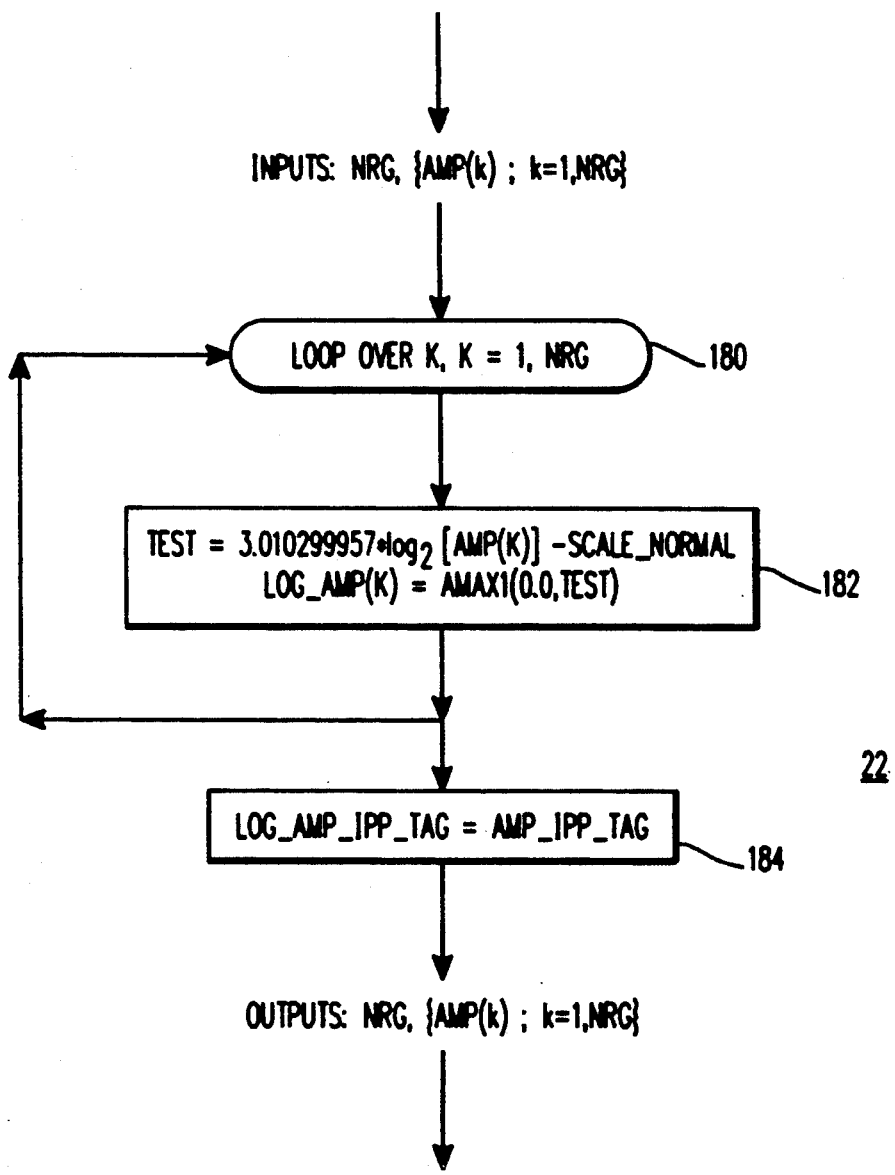
FIG. 7 depicts scale processing 22.

, where $S_i$ is the signal amplitude in the range gate i, $N_i$ is the noise in the range gate i and $N_p$ is the expected value of the post detection integrated noise. This operation has as inputs the amplitude vector, the number of range gates and the azimuth angle tag, and, as illustrated in FIG. 7, loops 180 over the range gates to compute 182 the ordered vector of range gated log amplitude data using a maximum function and a scale value which varies as a function of the selected range. This value is, for example, 8.85 dB at a scale of 320 nautical miles. The system then stores 184 the relative azimuth angle of the data. The output is the range gated log compressed amplitude data for the current beam pointing direction index along with the number of range gates and the azimuth tag.

Figure 8:
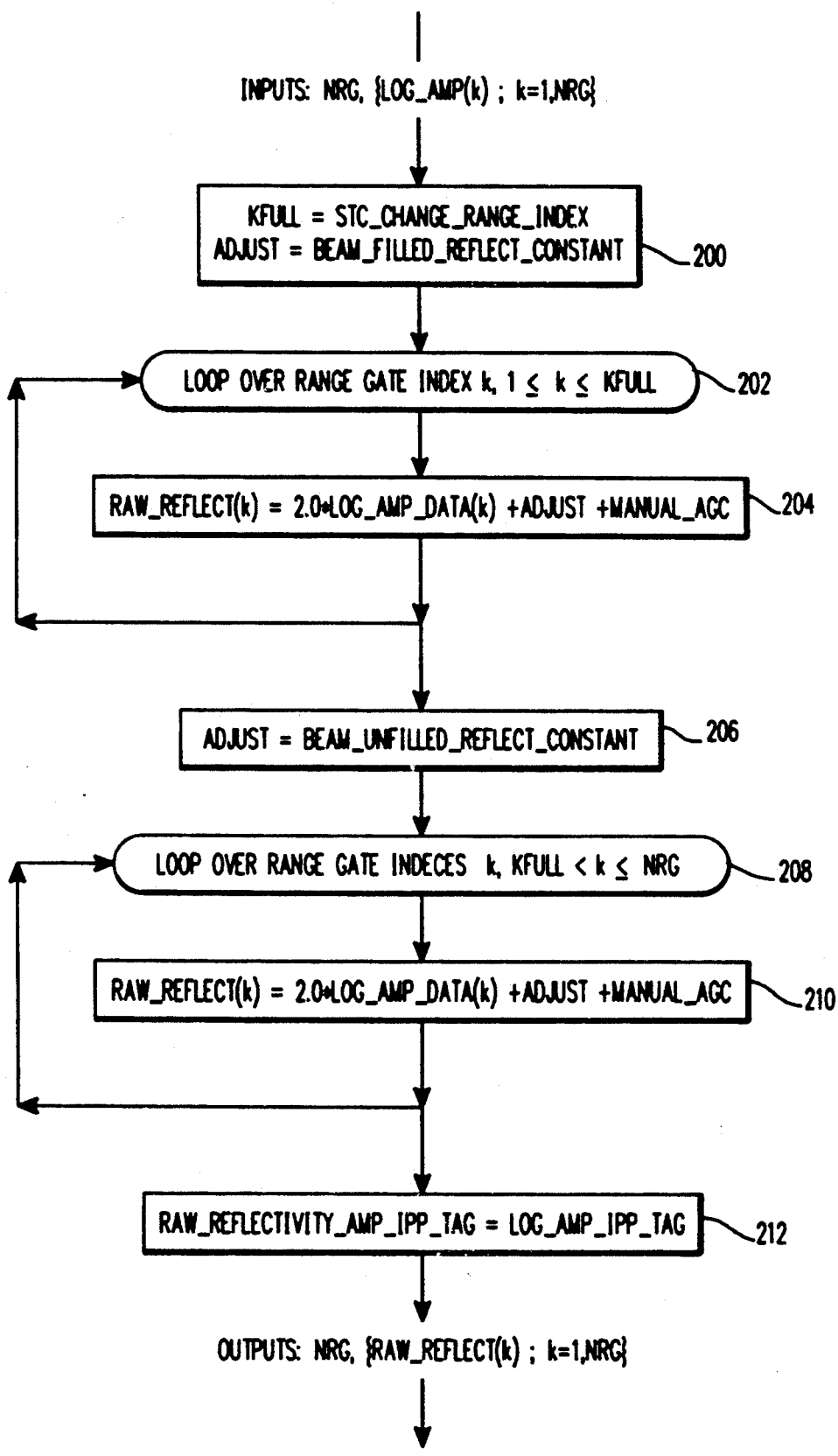
FIG. 8 depicts the reflectivity scale operation 24.

As illustrated in FIG. 8, the reflectivity scale process 24 rescales the input data to provide either apparent reflectivity (dBz for weather) or area clutter back scatter "sigma zero" [dB[sq. m/sq.m)]. The operation employs the appropriate constant, previously mentioned with respect to equations 5-7 passed by the control input operation 12. Sensitivity time control (STC) attenuation is employed to produce a uniform amplitude return over the range, that is, for ground clutter mapping $R^3$ profiling is performed and for weather $R^2$ and $R^3$ profiling is performed. The inputs include the number of range gates, the azimuth angle tag and the range gated log compressed amplitude vector scaled relative to expected noise. The process 24 starts, as illustrated in FIG. 8, by setting 200 a range gate limit to the range at which the STC profile changes from a beam filling target, $R^2$, to a nonbeam filling target, $R^3$, where for the conventional ARINC 708 30 inch diameter antenna with a 3 degree beam width the maximum range for beam filling is 59.3 nautical miles (110 kilometers). The system also sets the appropriate constant. The system then enters 202 a loop in which the input data is multiplied and adjusted by the reflectivity constant and the manually set automatic gain control value for the first beam filling range. The system then resets 206 the adjustment to the unfilled beam reflectivity constant to the second range. A loop 208 is then entered in which the remaining range data is adjusted 210. The system then stores the relative IPP count since the bar start. The outputs are the number of range gates, the adjusted amplitude vector and the azimuth tag.

Figure 9:
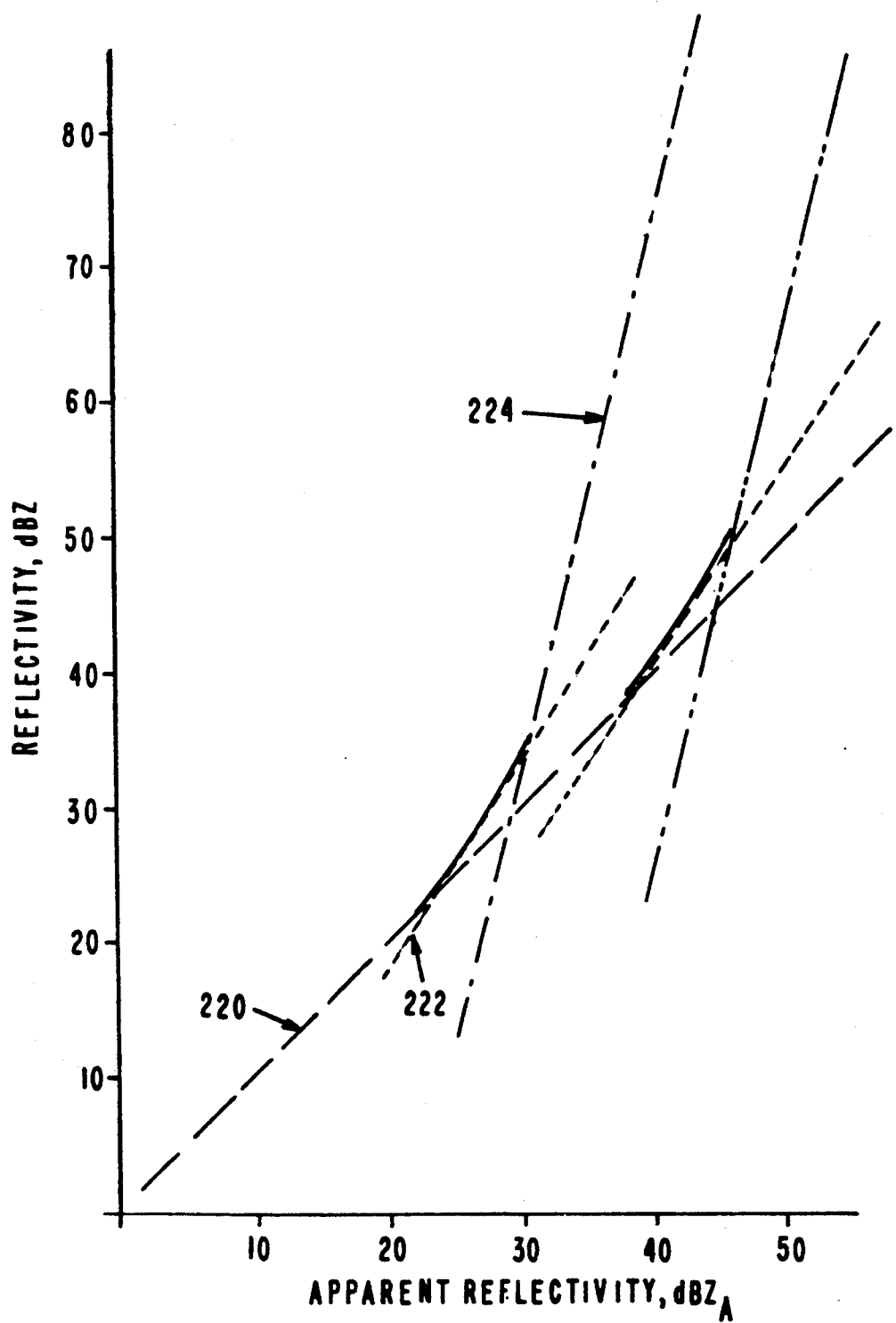
FIGS. 9 and 10 illustrate adjustments to reflectivity and attenuation in accordance with the present invention.
Figure 10:
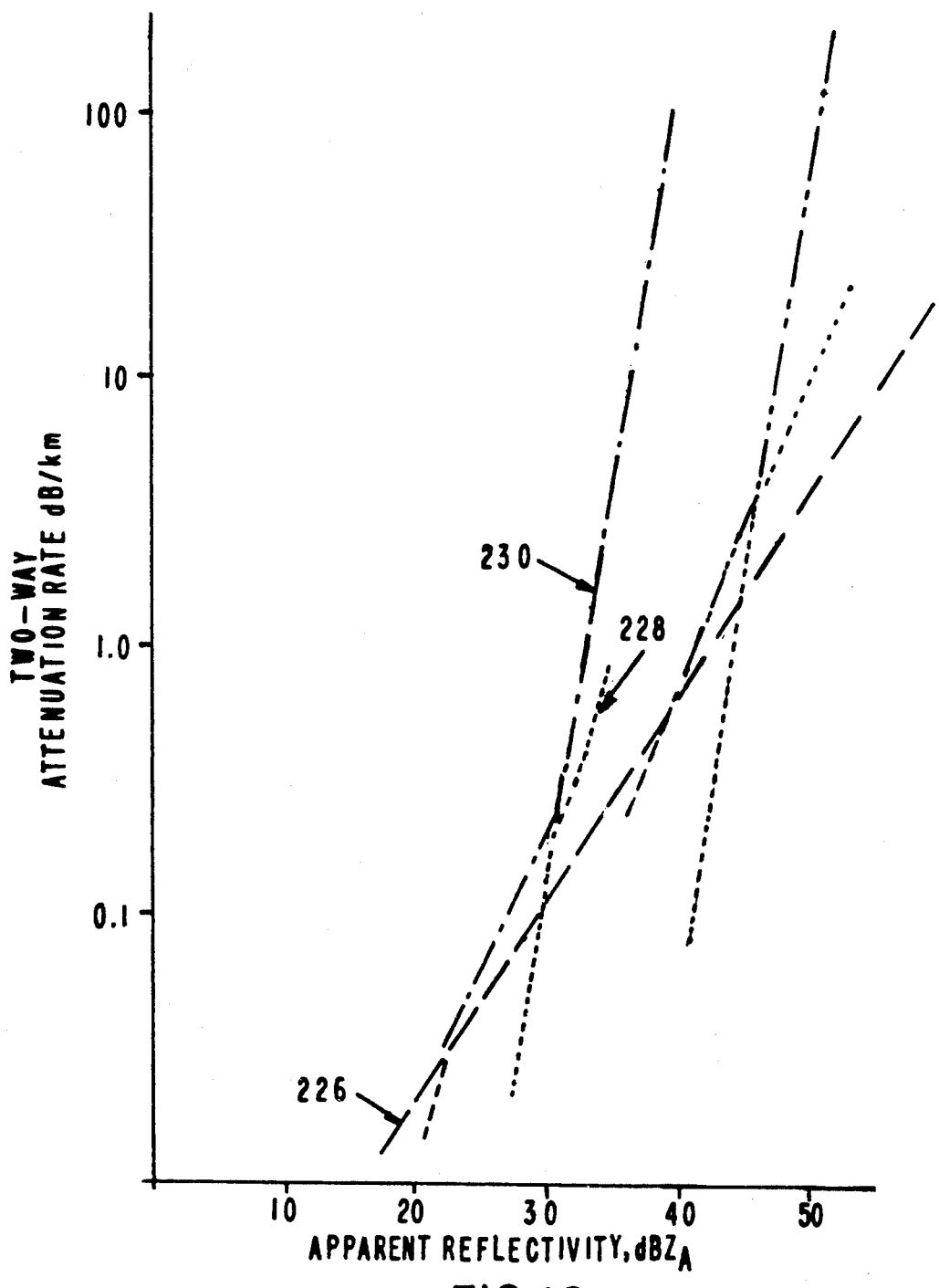
Figure 11A:
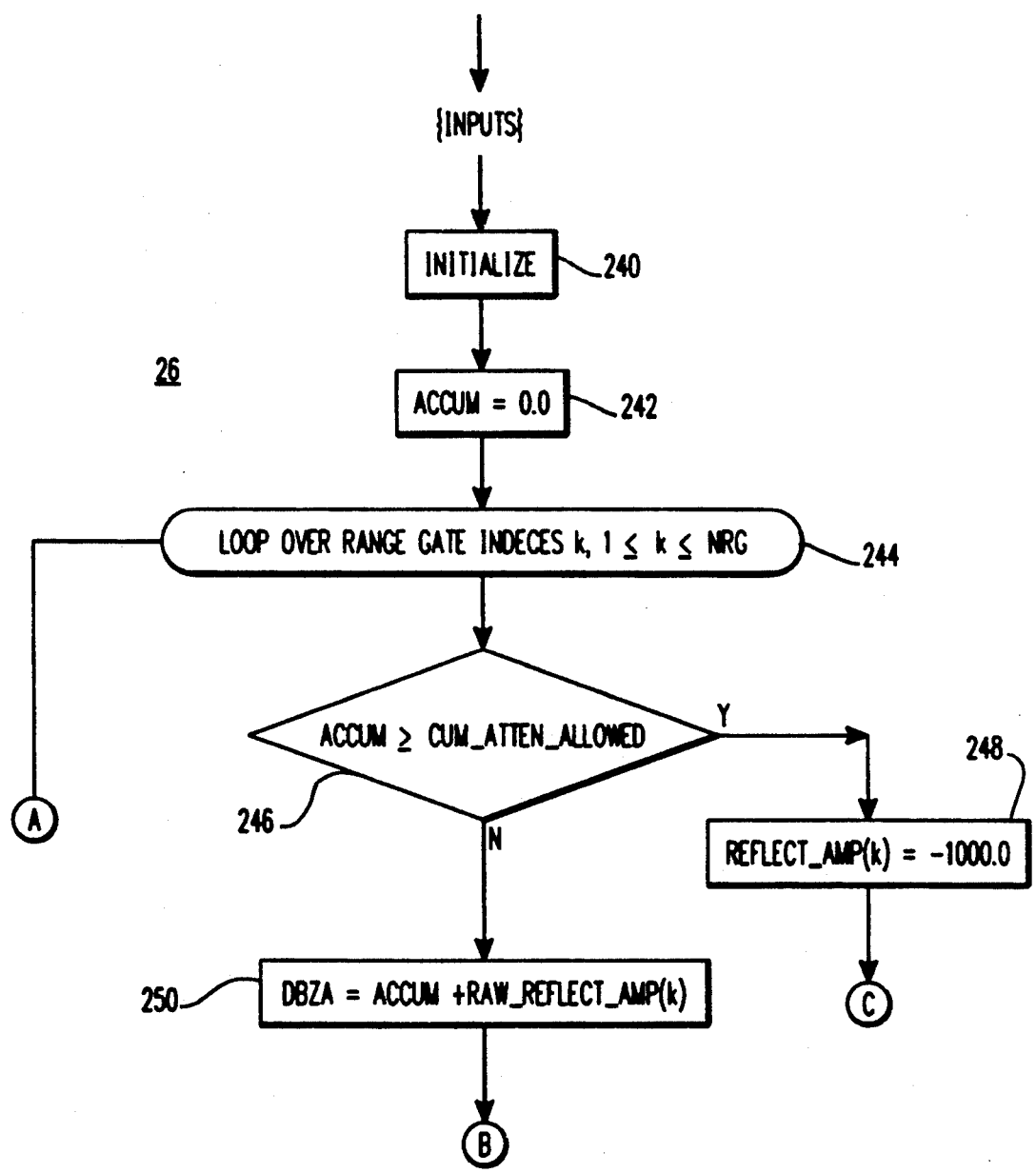
FIGS. 11A-11C depict the attenuation compensation process 26.
Figure 11B:
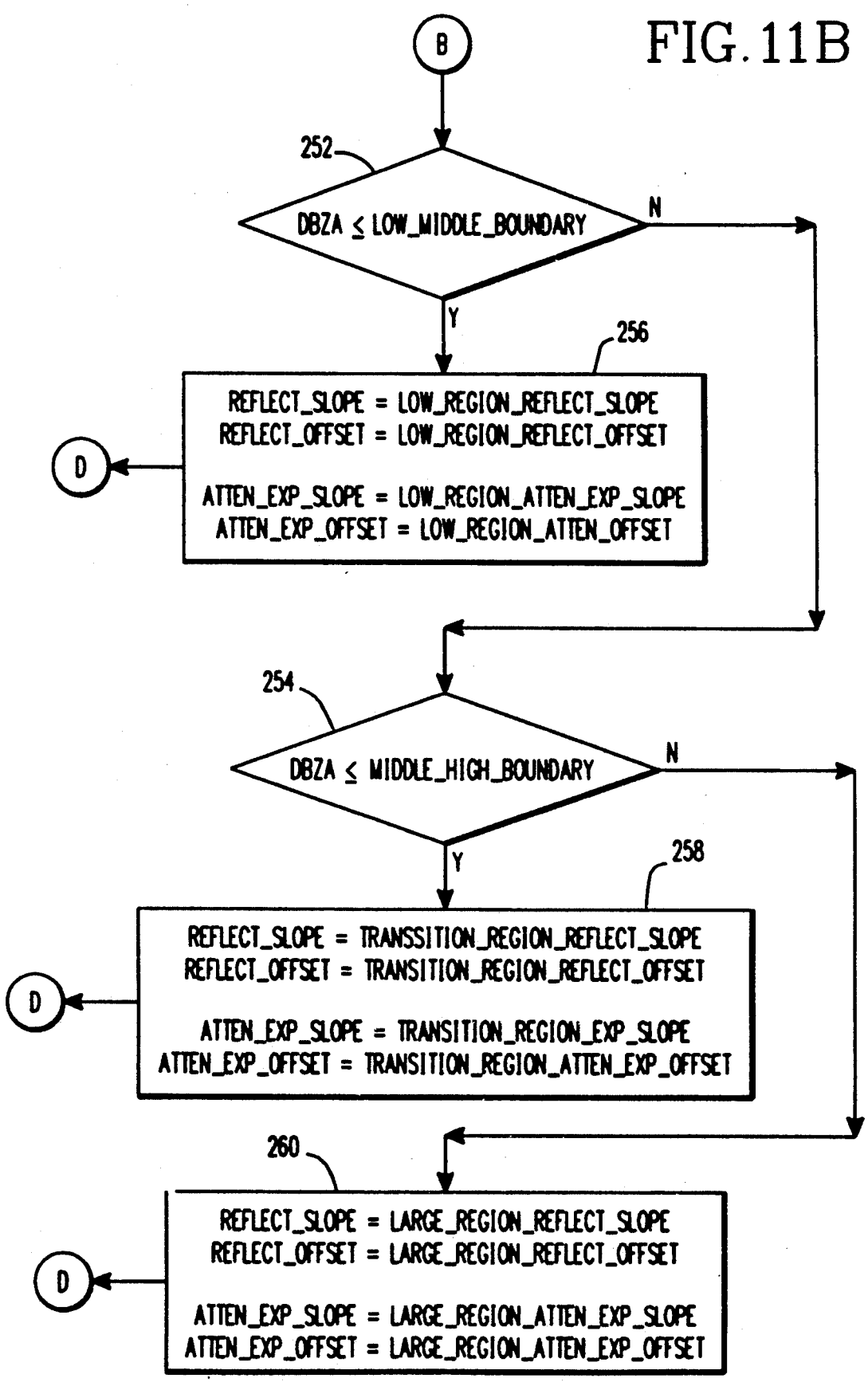
Figure 11C:
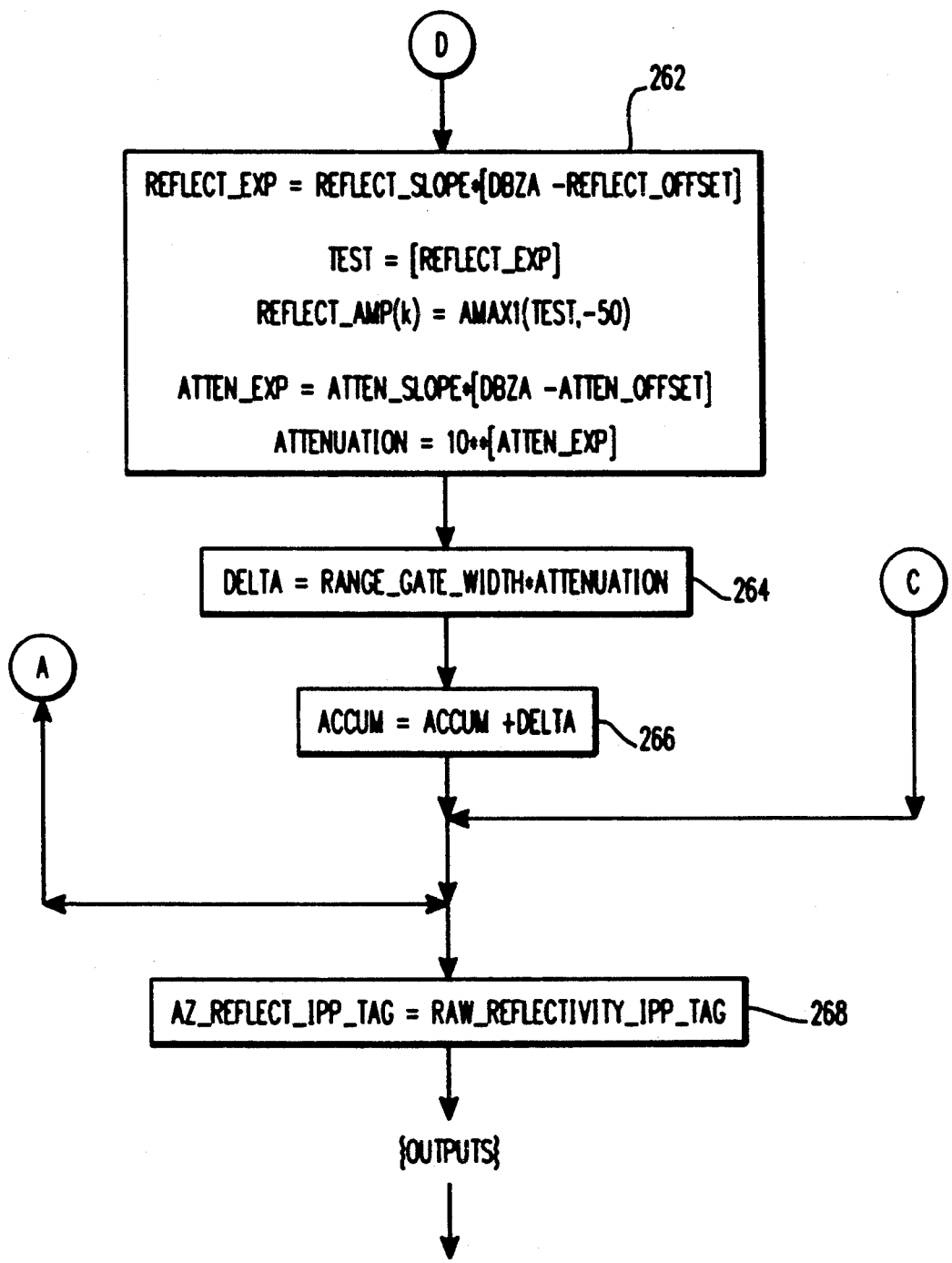
Figure 12A:
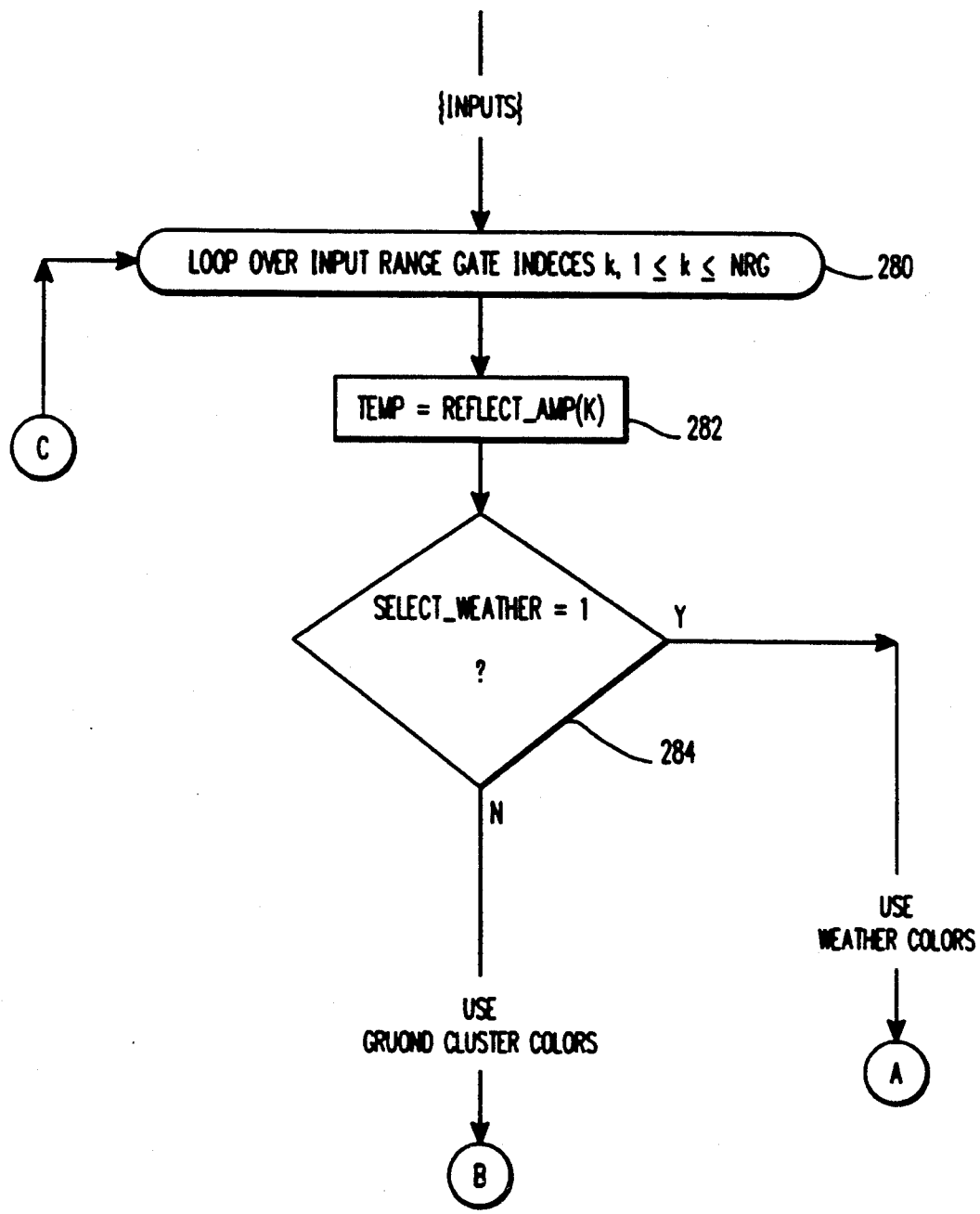
FIGS. 12A-12D show the display process 20.
Figure 12B:
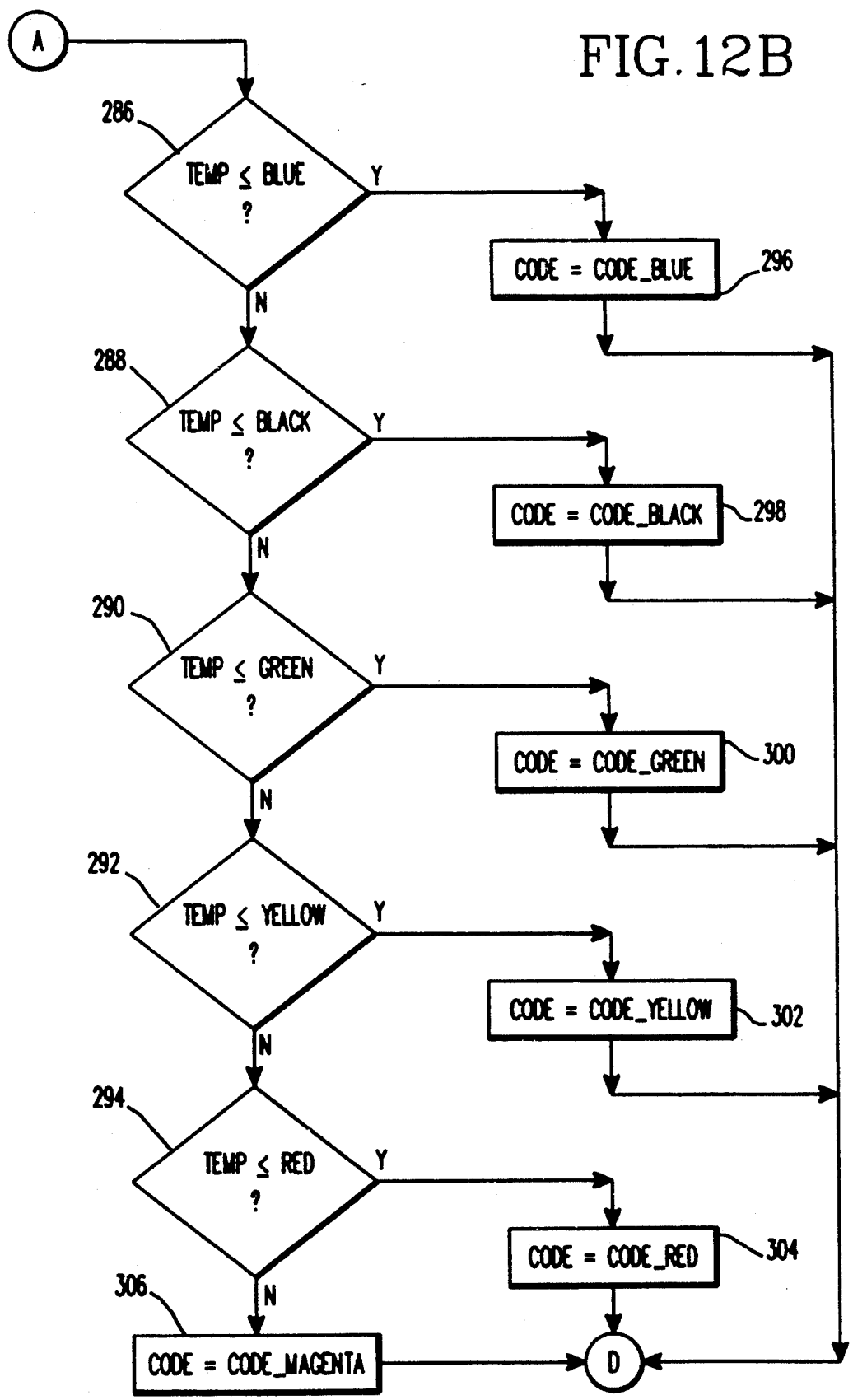
Figure 12C:
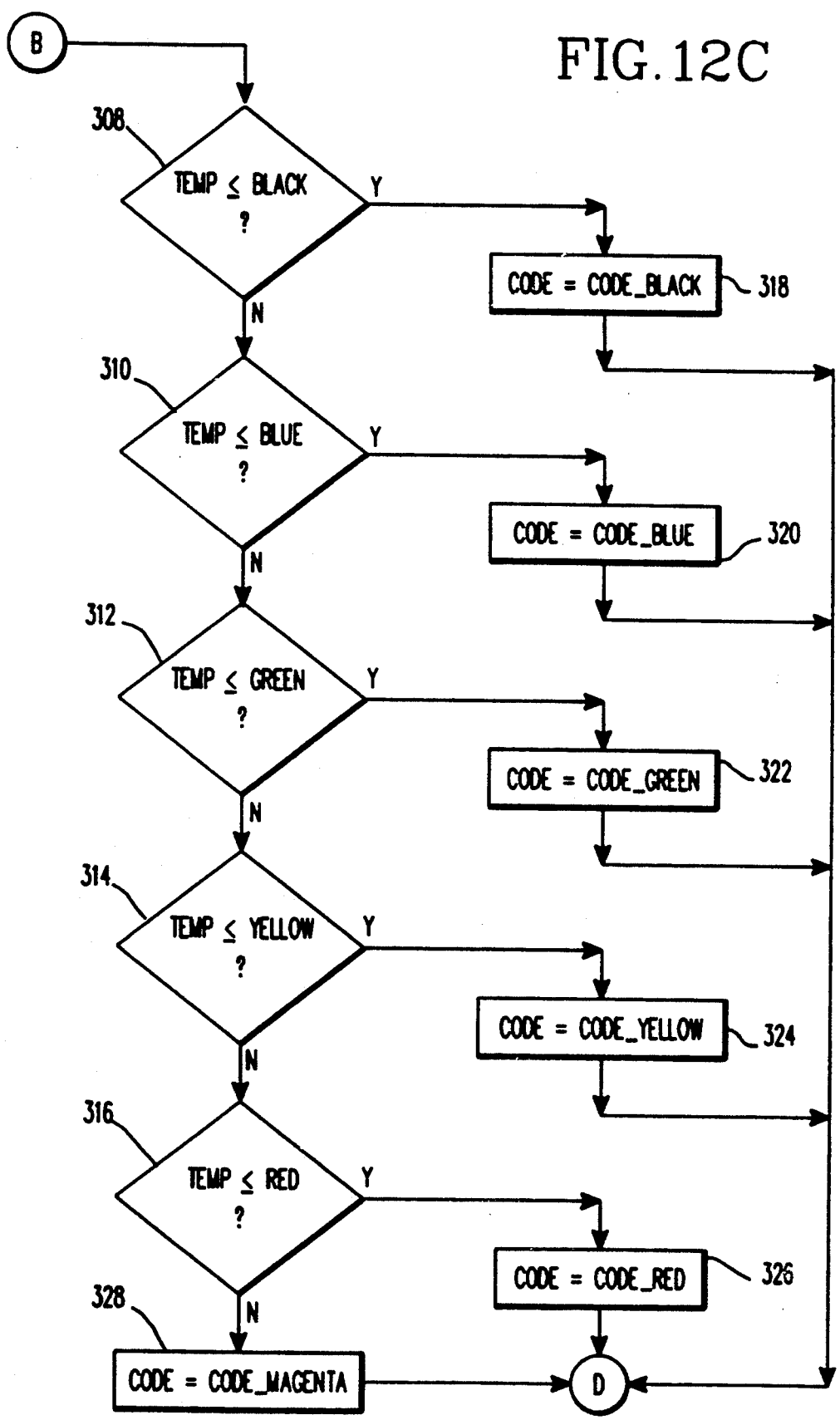
Figure 12D:
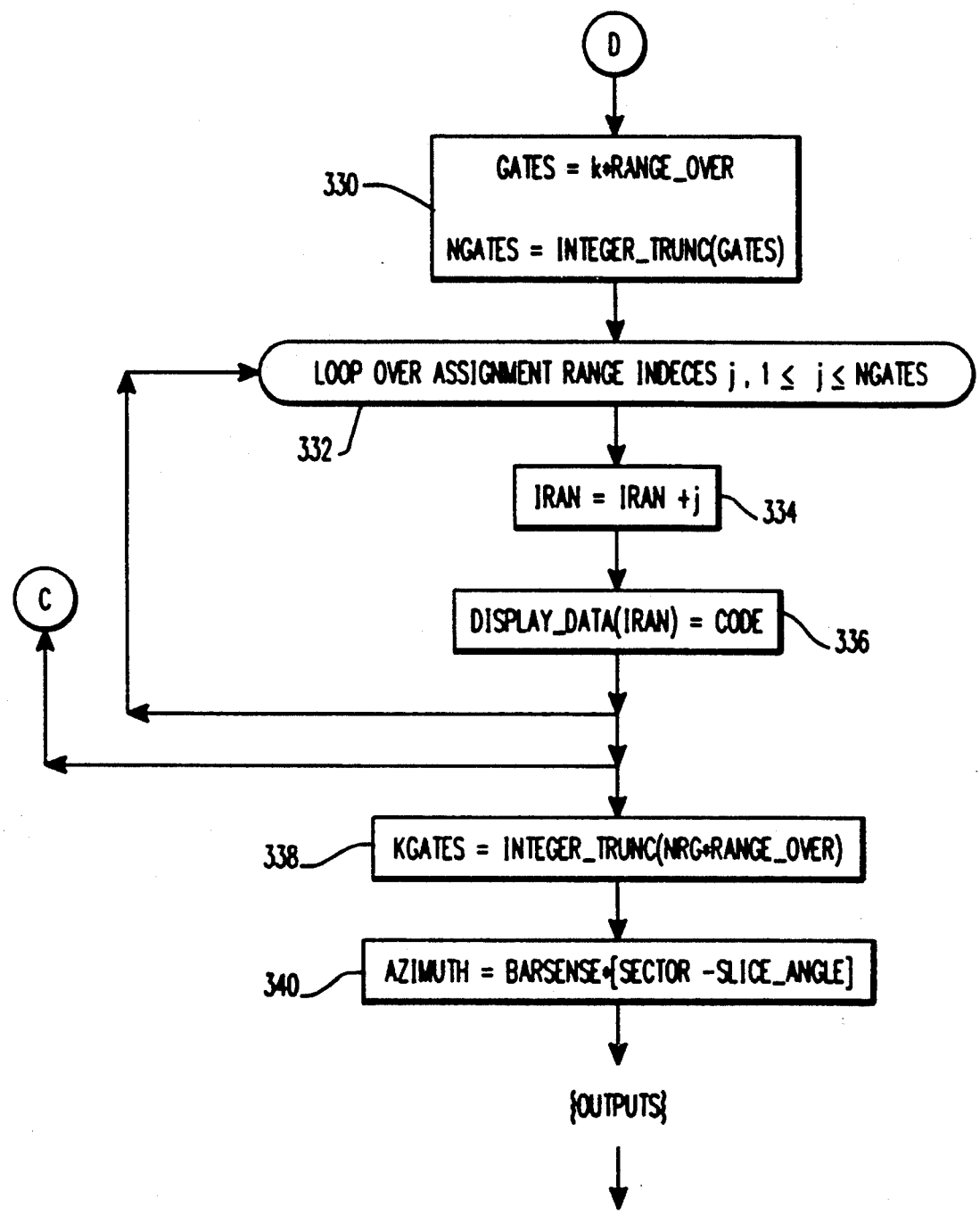

In the weather attenuation function 26, illustrated in FIGS. 11A-11C, the apparent reflectivity input from the prior process is converted into the rain rate implied reflectivity (dBZ) and attenuation. By starting at the earliest range gates, the determined intervening weather attenuation is compensated. When the attenuation becomes excessive, the return from distant portions of the range scale, that is, those lying below noise, cannot be discerned from noise and are indicated by a special level. The approximation for the reflectivity (dBZ) and attenuation rate ($\alpha$dB/km) of a range cell for low, medium and high rain rates are illustrated in FIGS. 9 and 10. These figures show the cases for two different range gates. The reflectivity curves are divided into three regions, 220 which is a low rain rate negligible self attenuation region, 222 a transition or medium rain rate region and 224 a self attenuation dominant or high rain rate region. As illustrated in FIG. 10 the two way attenuation rate from apparent reflectivity is also divided into a negligible region 226, a transition region 228 and a self attenuation dominant region 230. The three segment reflectivity and attenuation adjustments illustrated by FIGS. 9 and 10 can be obtained using a look up table including the values in the curves of FIGS. 9 and 10 or by the calculations set forth in equations 12-23 below where these equations represent an empirical model of rain rate (mm/hr), reflectivity and attenuation where $Z = 200 * r^{1.6}, \alpha = 0.032 r^{1.2}$ and r is the rain rate in millimeters per hour:

I. Small Rain Rate Region

When $\{dBZ_A \leq 32.4563 - 13.33 \log (\Delta R)\}$ (12)
$dBZ(dBZ_A) = dBZ_A$ (13)
$\alpha(Z_A) = .000602 (Z_A)^{\frac{1}{2}}$, dB/km. for Z in mm$^6$/m$^3$ (14)
or, as a function of $dBZ_A$,
$\alpha(dBZ_A) = 10**(.075*[dbZ_A - 42.94])$ (15)

II. Medium Rain Rate Approximation Region

(16)
When$\{32.45 - 13.33 \log(\Delta R) < dBZ_A < 39.39 - 13.33 \log(\Delta R)\}$
$dBZ(dBZ_A) = -17.86 + 7.33 \log(\Delta R) + 1.55*dBZ_A$ (17)
$\alpha(dBZ_A) = [.434/\Delta R]*10**\{.1162*$ (18)
$[dBZ_A - 36.11 + 13.33 \log(\Delta R)]\}$
$\alpha(dBZ_A) = 10**\{0.1162*[dBZ_A - 39.23 + 4.724$ (19)
$\log(\Delta R)$ III. Large Rain Rate Approximation Region When $\{39.39 - 13.33 \log(\Delta R) \leq dBZ_A\}$ (20)
$dBZ(dBZ_A) = 4*[dBZ_A - 28.6 + 10 \log (\Delta R)]$ (21)

$$\alpha(Z_A) = .032 \left( \frac{Z_A \Delta R}{2717.4} \right)^3$$ (22)

or, as a function of $dBZ_A$,
$\alpha(dBZ_A) = 10**\{.3*[dBZ_A + 10 \log(\Delta R) - 39.32]\}$ (23)

where $\Delta R$ is range gate width, $dBZ_A$ is apparent reflectivity in dBz, $Z_A$ is apparent reflectivity, Z is true reflectivity, dBZ is true reflectivity and $\alpha$ is the attenuation for two way transit through the rain gate. These equations allow accurate determination of the reflectivity and of the attenuation of each range gate which has already been adjusted for intervening weather attenuation, that is, the cumulative attenuation of proceeding range gates. The processing then becomes a matter of establishing cumulative attenuation up to the range gate in question, increasing the apparent reflectivity for that range gate by the cumulative attenuation, converting the apparent reflectivity into the equivalent rain rate and two way attenuation for that gate, incrementing the cumulative attenuation for the loss of sensitivity at subsequent range gates. The process 26 receives as inputs the number of range gates, the azimuth tag and the processed amplitude data provided by process 24. The system 26 starts, as illustrated in FIGS. 11a-11c by an initialization, which insures that any timing or data flow skew from bar initiation or counter reset are taken into account, and then setting 242 the cumulative attenuation to zero. The system then enters a range gate loop 244 to sequence through in the order of increasing range. In this loop the cumulative attenuation is compared 246 to the cumulative attenuation allowed, which is range scale selection dependent and defines the maximum cumulative intervening attenuation which can be tolerated for which the minimum detectable rain cell (3 nautical miles in diameter) is no longer detectable. When the attenuation has accumulated to this level, subsequent range gates are indicated 248 by a special number (color). If attenuation can be further accumulated the system increases 250 the apparent reflectivity by the cumulative attenuation. The value for the compensated apparent reflectivity is then used to select 252 and 254 the approximation for the rain rate derived reflectivity and attenuation for that range gate. The step 256 is the low rain rate adjustment, step 258 is the medium rain rate adjustment for the transition region and the step 260 is the large rain rat adjustment. These steps 256, 258 and 260 set the reflectivity slope and axial offset and the attenuation slope and offset from stored constants which reflect the curves of FIGS. 9 and 10 or the calculation of equations 12-23. Once the particular approximation is chosen the system calculates 262 the reflectivity adjustment and the attenuation for that range gate, and adjusts for range gate width 264 and increments 266 the cumulative attenuation by the two-way attenuation through that range gate. At the end of the loop the system stores the IPP count identifying the time and azimuth angle of the data. The outputs are the number of range gates, the azimuth tag and the compensated amplitude vector.

The display format and coloring operation 228 assigns colors to the reflectivity vector where the color assignment depends upon the mode (weather or ground map). If the number of range gates is not 256, the output color vector (the azimuth slice) is increased in dimension by a simple conventional neighbor replication operation. This operation 28, as illustrated in FIG. 12A-12D, starts with the amplitude data that has been attenuation compensated and loops 280 over range gates setting 282 a display temporary variable to the reflectivity amplitude. The system then determines 284 whether weather colors or ground clutter colors should be used responsive to a display selection. The encoding process for the weather color encoding tests 286-294 the temporary variable against the reflectivity value for the particular color and sets 296-306 the color code accordingly. The same testing 308-316 and coding 318-328 operations are performed for the ground clutter color coding. Once the color coding steps are completed the system updates 330 the range index scaling and enters a loop 332 which indexes 334 the display pixels contained within that range gate and outputs 336 the color code in binary format. The system then determines 338 a range scale transformation value (the number of range gates in the display) and determines 340, using the position of the antenna at the start of the scan and the direction (sense) of the bar, an azimuth value for the display.

The present invention has been described with respect to performing the azimuth sliding window PDI before attenuation compensation. It is possible to improve a weather radar display by performing only the azimuth sliding window PDI process without performing attenuation compensation, however, of course, this improvement will not be as great. The PDI process does increase the signal to noise ratio and extends the range and allowable cumulative attenuation.

The embodiment of the invention described herein utilizes a digital adjustment of the amplitude to boost the apparent return level. This boost takes place on a signal which has been attenuated by the STC profile. Greater sensitivity, that is, smaller indicated regions are returned from the desired minimally detectable range cell where amplitude is indistinguishable from noise, could be obtained by custom tailoring the STC profile to remove the appropriate analog attenuation. This approach to STC profiling would become part of a range gated attenuation loop which alters the STC profile (that is, selectively decreasing the amount of quiescent range profile attenuation) for the current azimuth slice on the basis of the rain return and the deduced rain echo attenuation of a recent, previous azimuth slice. In addition, the antenna scan rate for a ground map can be slowed to allow extended mapping ranges in adverse weather conditions, if the operator is provided with a scan rate control option.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of weather radar rain compensation, comprising:
   (a) determining a rain rate from a first radar return based on the apparent reflectivity of the rain within a first radar range gate region;
   (b) producing a two way attenuation value for the first radar range gate region from the rain rate responsive to first and second adjustment values, the first adjustment value corresponding to negligible self attenuation and the second adjustment value corresponding to dominant self attenuation, which second adjustment value is a non-linear function of said apparent reflectivity and of the width of said first radar range gate region; and
   (c) adjusting a second radar return from a second radar range gate region behind the first radar range gate region responsive to the two way attenuation value.

2. A method as recited in claim 1, wherein step (b) produces the attenuation valve responsive to a third adjustment valve, between the first and second adjustment valve, comprising a transition region.

3. A method as recited in claim 2, wherein the apparent reflectivity is compensated, prior to step (b), responsive to fourth, fifth and sixth adjustment values, the fourth adjustment value corresponding to negligible self attenuation, the fifth adjustment value corresponding to dominant self attenuation and the sixth adjustment value corresponding to a transition region between the fourth and fifth adjustment values.

4. A method as recited in claim 3, wherein said first and fourth adjustment values correspond to a small rain rate, said third and sixth adjustment values correspond to a medium rain rate and said second and fifth adjustment values correspond to a large rain rate where rain rate is determined from actual reflectivity.

5. A method as recited in claim 1, wherein before step (b) sliding azimuth window post detection integration is performed on the first radar return.

6. A method as recited in claim 1, wherein a reflectivity constant is set for ground mapping and said method further comprises producing a ground map display.

7. A method of compensating a weather radar received return signal to ensure it accurately indicates high rain rate weather comprising:
   (a) processing the radar return signal to determine an apparent reflectivity value associated with the rain rate in each radar range gate;
   (b) compensating said apparent reflectivity value with a self attenuation rain rate increment for radar return signals indicating high rain rate radar range gate regions, which self attenuation rain rate increment is a non-linear function of said apparent reflectivity value and of the width of the radar range gate region.

8. The method set forth in claim 7, wherein the steps (a) through (b) are carried out for each radar range gate through which the radar signal passes from the radar receiver to the specific radar range gate of interest.

9. An improved weather radar comprising:
   transmitter/receiver means for transmitting a radar signal and receiving a radar return signal;
   signal processing and compensation means for processing the radar return signal to determine an apparent reflectivity value associated with the rain rate in each radar range gate, and for compensating said apparent reflectivity value with a self attenuation rain rate increment for radar return signals indicating high rain rate radar range gates which self attenuation rain rate increment is a non-linear function of said apparent reflectivity and of the width of the radar range gate from which the received signal is had;
   display means for displaying a color pattern corresponding to the compensated radar return signal which accurately indicates high rain rates.

10. A radar as recited in claim 9, wherein said signal processing and compensation means compensates for a transition medium rain rate between a low rain rate and a high rain rate which results in self attenuation in the radar range gate.

11. A radar as recited in claim 9, wherein said signal processing and compensation means uses a ground mapping clutter reflectivity constant and said display means displays a ground map.

* * * * *